F. GARCIN.
Preparing Tallow for Candles.
No. 14,397.                                    Patented March 11, 1856.
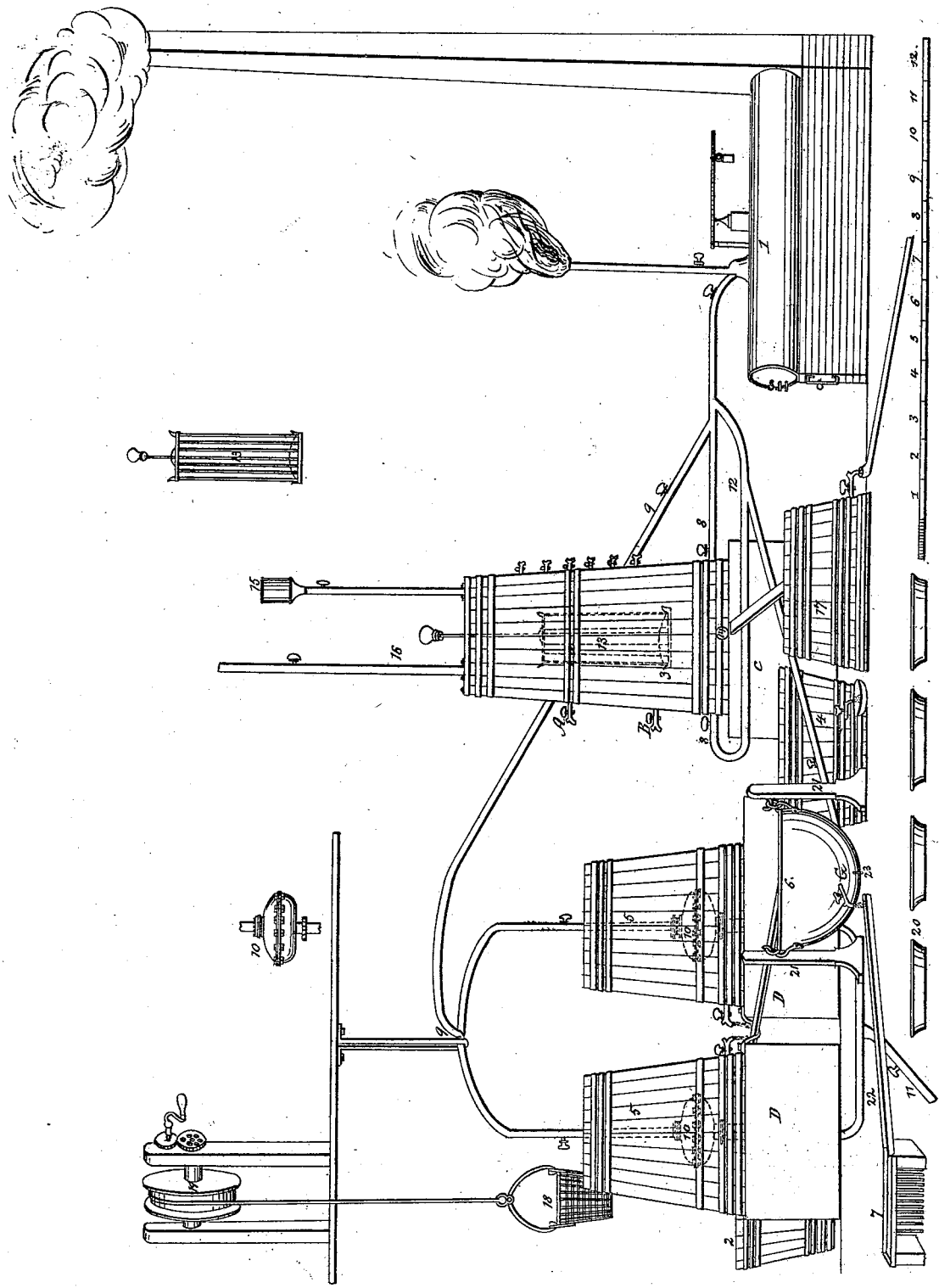

UNITED STATES PATENT OFFICE.

FRANÇOIS GARCIN, OF PHILADELPHIA, PENNSYLVANIA.

PREPARATION OF TALLOW FOR MAKING CANDLES.

Specification of Letters Patent No. 14,397, dated March 11, 1856.

*To all whom it may concern:*

Be it known that I, FRANÇOIS GARCIN, of the city of Philadelphia, in the Commonwealth of Pennsylvania, have discovered a new and improved method of making candles composed of fat and raw tallow in combination with other ingredients and with a new and useful machine for molding the same.

A description and specification of the mode of making the candles, the ingredients used in the process, the proportions of each, and the manner of preparing them, as well as a description and specification of the machine for melting, purifying and molding the candles is hereinafter contained, to wit: Assuming three thousand five hundred pounds as the quantity of fat or raw tallow to be used at one molding, and which is put when washed into reservoir (designated in the accompanying draft or drawing, as No. 2,) there is required for washing the above named quantity, viz: 3,500 lbs., three and one-half pounds (3½ lbs.) nitric acid at 22 degrees (of strength); when removed from reservoir No. 2 to No. 3, for the purpose of being melted or dissolved there is put into the fat or raw tallow previously washed, five pounds (5 lbs.) of sulfuric acid of 25 degrees (of strength) and on being thoroughly melted, the tallow is removed from reservoir No. 3 to No. 4, in the manner herein after described, when there is added to or put into the melted preparation five pounds of pure alcohol, seven pounds creta gallia, eleven pounds slaked lime and one and one half pounds camphor. For the purpose of purifying the combined preparation in No. 4 it is removed into two tubs Nos. 5 and 5, where the tallow prepared as aforesaid is purified and bleached or whitened by adding to it four pounds of borax and two egg shells. From Nos. 5 and 5 the preparation is removed into No. 6, which is a copper boiler with a double bottom in which the tallow is further purified and refined by the addition of one and one half pounds pure alcohol one half pound camphor, and one quarter of a pound of oil of lemon, and from thence the tallow so melted and prepared is poured into No. 7, the molds, which give to the candles such size and form as may be desirable; the wicks are formed of cotton yarn and put into the molds by hand.

The machine for melting and molding the candles consists of a steam engine of 7 horse power, designated in the accompanying drawing as No. 1; No. 2 is the receiver for washing the fat or raw tallow which compose the basis of the combination; No. 3 is a vessel used for melting the fat or tallow; No. 4 is a vessel or reservoir to receive the fat or tallow after having been melted; Nos. 5 and 5 are two tubs or reservoirs for purifying and whitening the tallow; No. 6 is a copper boiler with a double bottom for refining the tallow; No. 7 are the molds; Nos. 8 and 8 are steam pipes passing from the boiler No. 1 and communicating with No. 3 in which the tallow is melted; No. 9 is also a steam pipe passing from No. 1 to Nos. 10 and 10 to two small copper vessels inclosed in Nos. 5 and 5; No. 11 is a pipe for the escape of steam from Nos. 10 and 10; No. 12 is a pipe passing from No. 1 to No. 6; No. 13 is a grate to prevent the sediment from stopping up the cocks A and B; No. 14 is a vent or opening to let off or pass the sediment; No. 15 is a pipe through which the sulfuric acid is poured into No. 3; No. 16 is a pipe for the escape of steam from No. 3; No. 17 is a vessel for receiving the sediment from No. 3; No. 18 is a bucket for raising or hoisting the fat or raw tallow from No. 2 and conveying it to No. 3; No. 19 a system of wheels for hoisting bucket No. 18; No. 20, any number of tubs or vessels for the purpose of receiving and holding the purified tallow; No. 21 two posts or pillars for the support, in its place, of the boiler No. 6; No. 22 a vent for the escape of the steam from the double bottom of boiler No. 6, indicated by letter G.

Thus it will be seen, that what I claim as having invented, is—

A combination of fat, tallow and other ingredients hereinbefore specified for making fat or tallow candles of an improved quality, being firmer, harder, cleaner, and emitting a better light than any fat or tallow candles now in use, and also a machine for combining the ingredients and molding them when combined; for which in connection with the combination aforesaid I pray that Letters Patent of the United States may be granted to me as in my said petition accompanying this specification as set forth.

FRANÇOIS GARCIN.

Witnesses:
JNO. B. KENNY,
FD. RICARD.